United States Patent
Brandt et al.

(10) Patent No.: US 7,256,509 B2
(45) Date of Patent: Aug. 14, 2007

(54) WIND POWER PLANT COMPRISING A ROTOR BLADE ADJUSTING DEVICE

(75) Inventors: Karsten Brandt, Kiel (DE); Jörg Zeumer, Rendsburg (DE)

(73) Assignee: Repower Systems AG, Hamburg (DE)

( * ) Notice: Subject to any disclaimer, the term of this patent is extended or adjusted under 35 U.S.C. 154(b) by 64 days.

(21) Appl. No.: 10/567,636

(22) PCT Filed: Aug. 9, 2004

(86) PCT No.: PCT/EP2004/008901

§ 371 (c)(1),
(2), (4) Date: Feb. 8, 2006

(87) PCT Pub. No.: WO2005/017350

PCT Pub. Date: Feb. 24, 2005

(65) Prior Publication Data

US 2006/0163882 A1    Jul. 27, 2006

(30) Foreign Application Priority Data

Aug. 15, 2003    (DE) .............................. 103 38 127

(51) Int. Cl.
H02P 9/48 (2006.01)
F03D 9/00 (2006.01)

(52) U.S. Cl. ..................... 290/44; 290/55; 322/29; 416/147

(58) Field of Classification Search ............... 290/43, 290/44, 54, 55; 322/29, 37; 416/147, 163
See application file for complete search history.

(56) References Cited

U.S. PATENT DOCUMENTS

| | | | | |
|---|---|---|---|---|
| 4,426,192 A | | 1/1984 | Chertok et al. | |
| 4,695,736 A | * | 9/1987 | Doman et al. | 290/44 |
| 5,083,039 A | * | 1/1992 | Richardson et al. | 290/44 |
| 5,225,712 A | * | 7/1993 | Erdman | 290/44 |
| 5,798,631 A | * | 8/1998 | Spee et al. | 322/25 |
| 5,798,632 A | * | 8/1998 | Muljadi | 322/29 |
| 5,907,192 A | * | 5/1999 | Lyons et al. | 290/44 |

(Continued)

FOREIGN PATENT DOCUMENTS

DE    197 20 025    10/1997

(Continued)

*Primary Examiner*—Nicholas Ponomarenko
(74) *Attorney, Agent, or Firm*—Rankin, Hill, Porter & Clark LLP

(57) ABSTRACT

A wind power plant including a rotor having at least one angle-adjustable rotor blade, a generator that, for generating electrical power, can be directly or indirectly coupled to the rotor and, for supplying the electrical power, can be directly or indirectly coupled to an electrical grid, at least one rotor blade adjusting device for setting an angle of the rotor blade including at least one blade adjusting drive having at least one direct-current motor that can be coupled to the electrical grid via a converter, a control device, coupled to the converter and via which the control and/or regulation of the blade adjusting drive ensues, and a direct current voltage source that ensures a power supply to the blade adjusting drive in the event of grid power failure, whereby the direct current voltage source can be directly coupled to the blade adjusting drive or indirectly to the blade adjusting drive.

11 Claims, 2 Drawing Sheets

U.S. PATENT DOCUMENTS

| | | |
|---|---|---|
| 6,428,274 B1 | 8/2002 | Hehenberger |
| 6,921,985 B2 * | 7/2005 | Janssen et al. ................ 290/44 |
| 7,015,595 B2 * | 3/2006 | Feddersen et al. ............ 290/44 |

FOREIGN PATENT DOCUMENTS

| | | |
|---|---|---|
| DE | 196 44 705 | 4/1998 |
| DE | 29722109 | 5/1998 |
| DE | 196 51 364 | 6/1998 |
| DE | 198 45 903 | 4/2000 |
| DE | 199 41 630 | 3/2001 |
| DE | 100 09 472 | 9/2001 |
| DE | 100 33 029 | 1/2002 |
| DE | 101 17 212 | 10/2002 |
| WO | WO 02/05406 | 1/2002 |
| WO | WO 02/44561 | 6/2002 |

* cited by examiner

WIND POWER PLANT COMPRISING A ROTOR BLADE ADJUSTING DEVICE

BACKGROUND OF THE INVENTION

1. Field of the Invention

The present invention relates to a wind-driven power-plant comprising a rotor.

2. Description of Related Art

Known wind-driven power plants, in general, comprise a rotor fitted with three rotor blades and directly or indirectly linked to an electric power generator. The generator in turn may be connected to an electric power grid of a power supplier to feed said wind-driven power into said grid.

In known wind-driven power plants, the rotor blades are angularly adjustable. In this manner the attitude of the rotor blades illustratively impacted by strong winds may be adjusted to lower the wind power input. In this design, these kinds of powerplants adjust the rotor blades in a manner that at least one blade adjustment system is used for all three rotor blades. Known wind-driven power-plants provide at least one rotor blade adjustment system to each rotor blade, each system including one blade adjusting drive with a DC motor coupled through an inverter to the electric grid. As a rule, the relatively high rotational speed of the drive motor is reduced by a step-down gear of very high reduction ratio onto a slowly rotating drive pinion, meshing with a crown gear connected directly to the rotor blade. The rotor blade adjustment system also includes a control unit controlling the blade adjustment drive.

The wind-driven power-plant must be allowed to be decelerated, i.e. lowering its power output and/or being shut down at any time and in the presence of any malfunction to secure it against damage and to make it safe.

As a rule, known wind-driven power-plants are decelerated by rotating the rotor blades into the known "feathered pitch" position. "Feathered pitch" means the rotor blades are rotated away from the wind so that, as in a flag exposed to wind, the effective blade surface impacted by the wind is minimized and hence the wind no longer can apply the power that would be required to maintain rotor rotation and on that account the power-plant shall be stopped entirely or at most shall rotate only very slowly.

Malfunctioning may for instance include electric grid failure. In such a case, the grid manager/operator may prescribe separating the wind-driven power-plant within a given time interval from the grid to protect latter. Separating the wind-driven power-plant from the grid in turn perforce prevents feeding the power-plant output into said grid and critical, excessively high rotor speeds may ensue. For its own protection the power-plant itself must be able to rapidly reduce its rotor speed.

On the other hand, grid failure also entails that the electrical blade adjustment system no longer is electrically fed from it and that the wind-driven power-plant rotor speed no longer can be reduced. In order to nevertheless decelerate the wind-driven power-plant by rotating the rotor blades into the feathered position, a DC voltage source is provided additionally in the rotor blade adjustment systems of known wind-driven power-plants and is directly applied to the blade adjustment drive when the power grid fails, thereby assuring power at all times to the blade adjusting drive.

This known wind-driven power-plant, however, incurs a drawback that because of directly connecting the DC voltage source to the blade adjusting drive, the rotor blades can be rotated only in an uncontrolled manner in a general direction of feathering. Control to accurately set a desired rotor blade angle, or in particular a given rate of rotor blade adjustment, is impossible when wind-driven power-plants of the state of the art discussed do experience malfunctions.

As a result, when the external grid fails, the rotor blades of a wind-driven power-plant must necessarily be rotated into the fully decelerated, i.e. feathered position, whereby in general the power-plant rotational speed will be decelerated fairly abruptly. However, abruptly shutting down a power-plant always entails high stresses that are a factor in power-plant size and hence entail larger power-plant costs.

Moreover, the constrained reduction in power-plant rotational speed always penalizes the power-plant operator economically. Such losses will be especially irksome when illustratively the external grid failure is very brief whereas the speed reduction and the ensuing startup of the power plant generally require considerably more time than the duration of external grid failure.

The objective of the present invention is to so further develop a known wind-driven power-plant as to allow optimized regulation of the rotor-blade angle both in normal operation and, especially, in the presence of various malfunctions, for instance failure of the external grid.

BRIEF SUMMARY OF THE INVENTION

The wind-driven power plant defined in claim 1 comprises a rotor fitted with at least one angularly adjustable rotor blade. Moreover, it includes a generator which is directly or indirectly connected to the rotor to generate electrical power and which may be connected directly or indirectly to an external electrical grid in order to apply the power-plant output to the grid, and at least one rotor-blade adjustment system to set the rotor blade angle, whereas, as regards several rotor blades—as a rule there are three blades per power-plant—one rotor blade adjustment system may be used for each rotor blade.

The rotor blade adjustment system includes at least one blade adjusting drive with at least one DC motor which can be connected through a converter to the external electrical grid, further a control unit connected with the converter and implementing the control and/or regulation of the blade adjusting drive, and a DC voltage source which, in the event of external grid failure, shall power the blade adjusting drive.

Be it borne in mind that hereafter a distinction no longer shall be made between "control" and "regulation" because the present invention allows using either to operate the rotor blade adjustment system. Therefore the expression "control unit" shall also include the meaning of blade angle regulation.

In the present invention, the DC voltage source can be connected both directly and indirectly through the converter to the blade adjusting drive, priority being given to link the DC voltage source indirectly by means of the converter to the blade adjusting drive, the converter being designed in a manner that it can convert both the AC from the external grid and the DC from the DC voltage source.

The wind-driven power-plant of the present invention offers the advantage that the blade adjusting drive can be regulated by the control unit even when the external grid fails. In case of a grid failure and the attendant need to decelerate the power-plant, the rotor blade no longer is rotated immediately, i.e. in uncontrolled manner, into the feathered position, rather the invention allows the rotor blade to be rotated slowly, at a predetermined adjustment rate, into the feathered position. This feature offers the advantage that the power-plant is not shut down abruptly, but instead may be slowly taken out of operation.

The alternative of directly connecting the DC source to the blade adjusting drive remains applicable as before and offers the advantage that, in the event of converter failure, the wind-driven power-plant can be decelerated by rotating the rotor blades into the feathered position both for the sake of safety and to protect the power-plant.

As regards wind-driven power-plants of which the blade adjusting drive comprises an AC motor instead of a DC motor, it is known to couple the DC voltage source to the converter. However, such non-species wind-driven power-plants incur the drawback that in the event of converter failure, illustratively due to a lightning strike, the rotor blade adjusting system fails simultaneously and, therefore, it would be impossible to turn down/off the wind-driven power-plant in an emergency.

Accordingly, employing a DC motor in the blade adjusting drive must be deemed especially advantageous because the DC motor can be connected directly to the DC voltage source even when the converter is inoperative, and thereby the rotor blades can be reliably rotated into the feathered position in any case in order to turn down/off the wind-driven power-plant.

As already cited above, the wind-driven power-plant of the state of the art can be slowed down or shut off only by the rotor blades being constrained to rotate into the feathered position. However such constrained rotor blade rotation entails that the power-plant shall be decelerated abruptly, whereby it is subjected to very high loads.

Because the present invention allows for deceleration of its wind-driven power-plant in a regulated manner, the high loads may be reduced and accordingly such high loads no longer need be considered when selecting the dimensions of said power-plant, which thereby can be manufactured in more economical manner.

Furthermore, the rotor blades may be reliably rotated synchronously into the feathered position by means of the overriding control unit. In other words, the rotor blades are synchronously rotatable into the feathered position, resulting again in lowered loads in the power-plant.

The present invention also offers the advantage that the power-plant need not mandatorily be decelerated in the event of a grid failure, instead the invention creates the advantage that, in such an event, the rotational speed of the wind-driven power-plant can be kept constant over a given time interval by means of rotor blade angle which still remains controllable, or it may be regulated in other ways, as desired. Accordingly, power-plant operation may be advantageously maintained over a short time interval in case of a short-term grid failure, and the economical losses otherwise incurred due to the immediate shutdown of the power-plant are minimized.

In one advantageous embodiment of the present invention, regulation of rotor blade adjustment of a wind-driven power-plant of the invention in the case of grid failure may be implemented by using the control unit and by means of a malfunction mode.

The malfunction mode may be stored in the power-plant. However the mode may be generated in the control unit only upon occurrence of a malfunction, or the malfunction may be fed to the control unit, for instance, by a managing computer regulating overall power-plant or wind-farm operation.

The malfunction mode allows determination of the kind of blade-adjustment regulation needed for a particular malfunction. The malfunction mode may be programmed in a manner that it can discriminate between different kinds of malfunction and then carry out different types of regulation. Illustratively, the malfunction mode memory may know that for a failure of one or more grid phase failures the rotor speed shall be kept constant over a defined time interval and the wind-driven power-plant shall be decelerated only following such an interval and continuing grid failure.

The malfunction mode also may contain instructions, for instance, that in the case of converter malfunction, the battery or batteries shall be switched directly to the blade adjusting drive. Furthermore, the malfunction mode also may contain an appropriate procedure in a manual emergency shutdown device because the power-plant must be switched off while being as stress-free as possible to assure high safety to the personnel. For that purpose, the instructions stored in the malfunction mode might command that the power-plant be shut down as fast as possible but also in non-damaging ways using a controlled rate of blade adjustment.

In another embodiment mode of the present invention, the wind-driven power-plant offers the advantage that, in case of wind-driven power-plant malfunction and simultaneous separation from the grid, the blade adjusting drive can be controlled by indirectly connecting the DC voltage source through the control unit in order to start up the power-plant, where "grid separation" for instance is construed both as a grid malfunction and deliberately switching off the grid.

In another advantageous embodiment of the present invention, the DC voltage source is a battery. Advantageously, the battery is a readily available energy storage means able to supply the power required to drive the DC motor.

However, so-called ULTRACAPS also may be used as the DC voltage source, these being compact capacitors of high energy density able to store the energy required to drive the DC motor.

Conceivably too, DC generator may be used which would be driven by the rotor's rotation, namely its kinetic energy. For that purpose, one active generator part is ganged in rotation with the power-plant rotor (preferably the rotor hub) and the other active part is firmly affixed in position on the power-plant pod. As soon as the rotor is rotating, a speed-dependent DC generator may be tapped at the generator terminals which, following any required conversion (for instance by step-up converters), is then applied to the intermediate converter circuit or directly to the blade adjusting drive.

In normal operation, to provide power, the DC motor of the blade adjusting drive is connected by means of a converter to the AC grid of the grid operator, the converter changing the AC power from the grid into DC power. In the present invention, the converter furthermore is able to convert applied DC power in a manner that the DC motor can be operated in controlled manner by means of the converter.

In an advantageous embodiment of the present invention, the converter is designed to comprise rectifiers transforming the applied grid AC voltage into a pulsed DC voltage and, moreover, to include an intermediate DC voltage circuit to smooth the voltage between the rectifier and the DC motor. The intermediate DC voltage circuit essentially acts as a buffer to compensate for transient load requirements (voltage notches).

However, DC power of variable current and voltage values being required to operate the DC motor in regulated manner, the converter additionally is fitted with a DC chopper controller having active switches driven by the control unit. By appropriately controlling the active switches, the power in the intermediate circuit can be converted into adjustable DC power such that said DC motor rotates the rotor blade at a desired adjustment rate into the desired angular position.

In another advantageous embodiment mode of the present invention, the active switch in the DC chopper controller may be an IGBT power transistor. IGBT power transistors offer the considerable advantage that they can be turned ON and OFF as needed. This advantage allows the DC motor to be operated in a regulated manner by means of the converter regardless of this converter being connected to the electric grid or to the DC voltage source.

In a further embodiment of the present invention, the DC voltage source is connected through the intermediate DC circuit to the converter. Illustratively, the connection is implemented by diodes in which case the voltage differential of DC voltage source and DC voltage intermediate circuit must be correspondingly matched to prevent individual components from being overloaded. This design offers the advantage that on one hand the DC voltage source supports the DC voltage intermediate circuit in the event of grid failure. On the other hand, the power required for operating the DC motor in a controlled manner in spite of grid failure is made available to the converter in this design.

In a further embodiment of the present invention, the rotor blade adjustment system includes an angle encoder measuring the angle of the rotor blade and transmitting this value to the control unit. This feature offers the advantage that the control unit or a managing computer connected to the control unit on the basis of said measured value also may take into account other power-plant parameters to determine a rotor blade angle, allowing optimal operation and hence optimal power economy.

The angle encoder, moreover, allows monitoring an angle predetermined by the control unit, and where called for, to modify it.

The various steps discussed above relate to solving operational malfunctions that may occur in the electrical power supply at the rotor blade adjustment system. The objective of the invention is to allow controlled adjustment of the rotor blades, for instance in case of grid failure. Accordingly, a considerable problem likely to affect wind-driven power-plant operation has been dealt with.

However, rotor blade adjustment devices are rather complex. Other malfunctions also may arise, that may degrade the controlled adjustment of the rotor blades, and consequently the need for optimization is present all the time.

Another approach to problem solving is discussed below, to optimize the controlled adjustment of the rotor blades and to assure such optimization in particular in case of a further malfunction that is independent of the electrical system.

Both the solutions discussed within the scope of the present invention allow, separately or in combination, to optimally control and/or regulate the power-plant and assure that the power-plant shall remain operational when various operational malfunctions arise. In this manner, the essential goal, namely to design a wind-driven power-plant in a manner that malfunctions shall be compensated and that the power-plant must be decelerated only for really serious malfunctions, is easily reached in this way.

As regards the second problem solving approach, the rotor blade adjustment system comprises at least two angle encoding devices, the control unit being designed to switch from the malfunctioning angle encoding device to the other operational one.

In an advantageous embodiment of the present invention, the first angle encoder illustratively is mounted on the DC motor shaft of the blade adjusting drive, the shaft also constituting the drive side i.e. the so-called "fast" side (because of the higher speed of rotation) of the rotor blade adjusting drive.

Advantageously, the second angle encoder is mounted directly on the rotor blade shaft or on a pinion meshing with the toothing of the blade bearing. In other words, the second angle encoder is mounted on the so-called output or rotor blade side, or the "slow" side of the rotor blade adjustment system.

Providing at least one additional angle encoder offers the advantage that the measured blade angles can be compared, so that, if there were pronounced dispersion of the test values a sensor defect or, for instance, malfunction (rupture) of the blade drive could be detected. In such a case, the control unit can switch over to the second angle encoder to always assure instantaneous blade angle detection.

The two above approaches are combined in an especially advantageous embodiment of the present invention. This embodiment offers a very safe power-plant which optionally is also regulated in normal operation.

However, the last cited design may be implemented separately, that is, besides being applicable to a claimed wind-driven power-plant comprising a DC driven rotor blade adjustment system. Moreover one or more angle encoders may be easily used in other rotor blade adjustment systems illustratively powered by AC.

Further features, aspects and advantages of the present invention are disclosed in part by the description below and are made obvious in part by the description or they result from the practical application of this invention. One illustrative embodiment of the present invention is comprehensively discussed below. It is understood that other embodiments may be used and can be modified without thereby transcending the scope of the present invention defined by the appended claims.

DETAILED DESCRIPTION OF THE INVENTION

Figure 1:
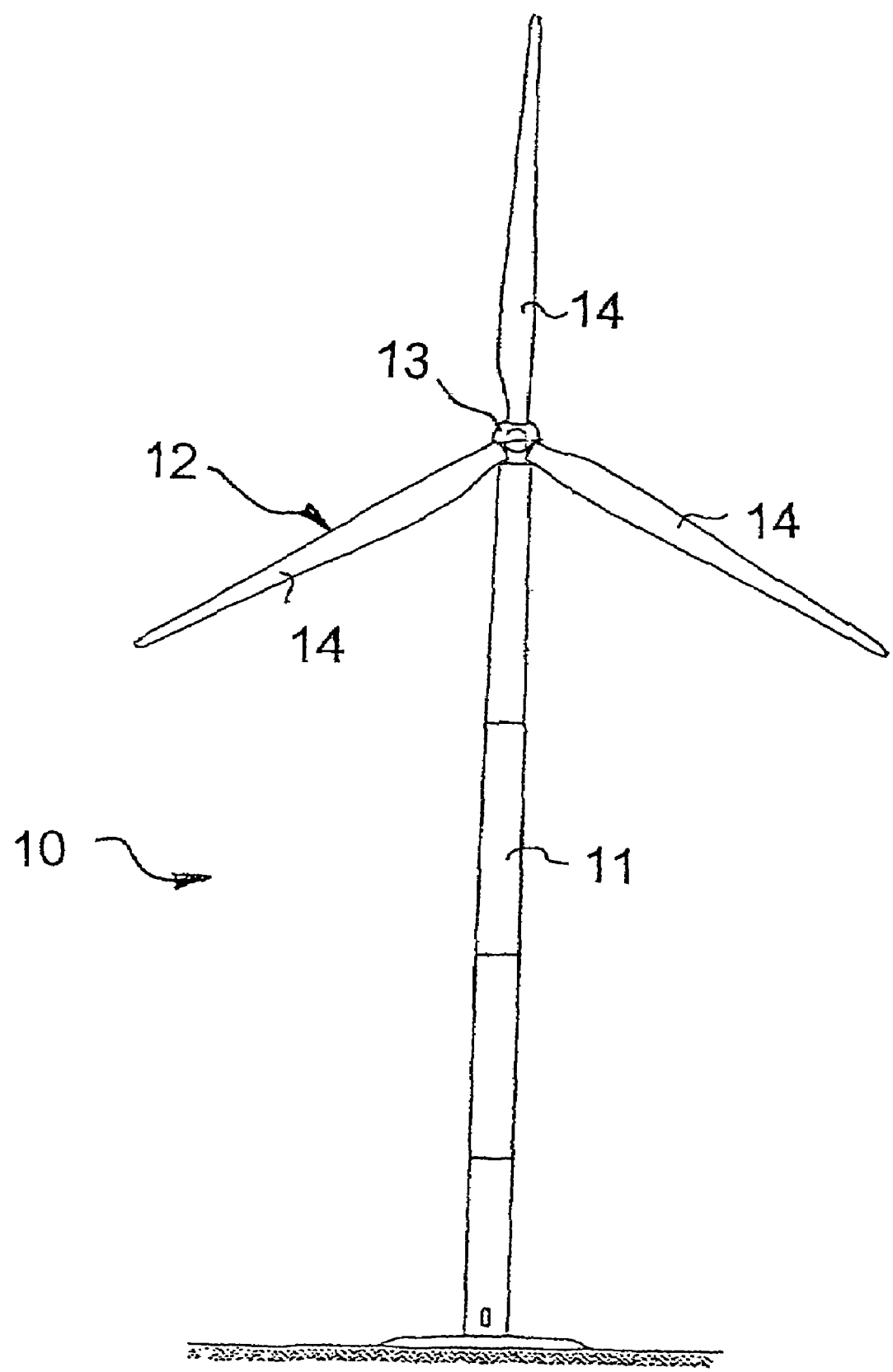
FIG. 1 is a front view of a wind-driven power-plant.

FIG. 1 shows a wind-driven power-plant 10 on a tower 11 of which the upper end supports a rotor 12. The rotor 12 is made up of a rotor hub 13 and of three rotor blades 14 affixed to the hub 13.

The rotor blades 14 are rotatably connected to the rotor hub 13 and can be individually adjusted about their longitudinal axis of rotation to adjust the wind power applied to the rotor 12. The rotor blades 14 are connected to the hub 13 by means of bearings, for instance by four-point contact ballbearings or rotary ballbearings, the ballbearing supporting the rotor blade which is fitted with an inner toothing.

The rotor blades 14 are adjusted by the rotor blade adjustment system—not shown in detail—using a blade adjusting drive which is fitted with a drive pinion configured to mesh with the inner toothing. The blade adjusting drive also comprises a drive motor connected by a gear unit to the drive pinion which in this manner can be moved into rotation by the drive motor. In this manner, the drive motor can adjust the rotor blade by the drive pinion meshing with the bearing component supporting the blade.

Figure 2:
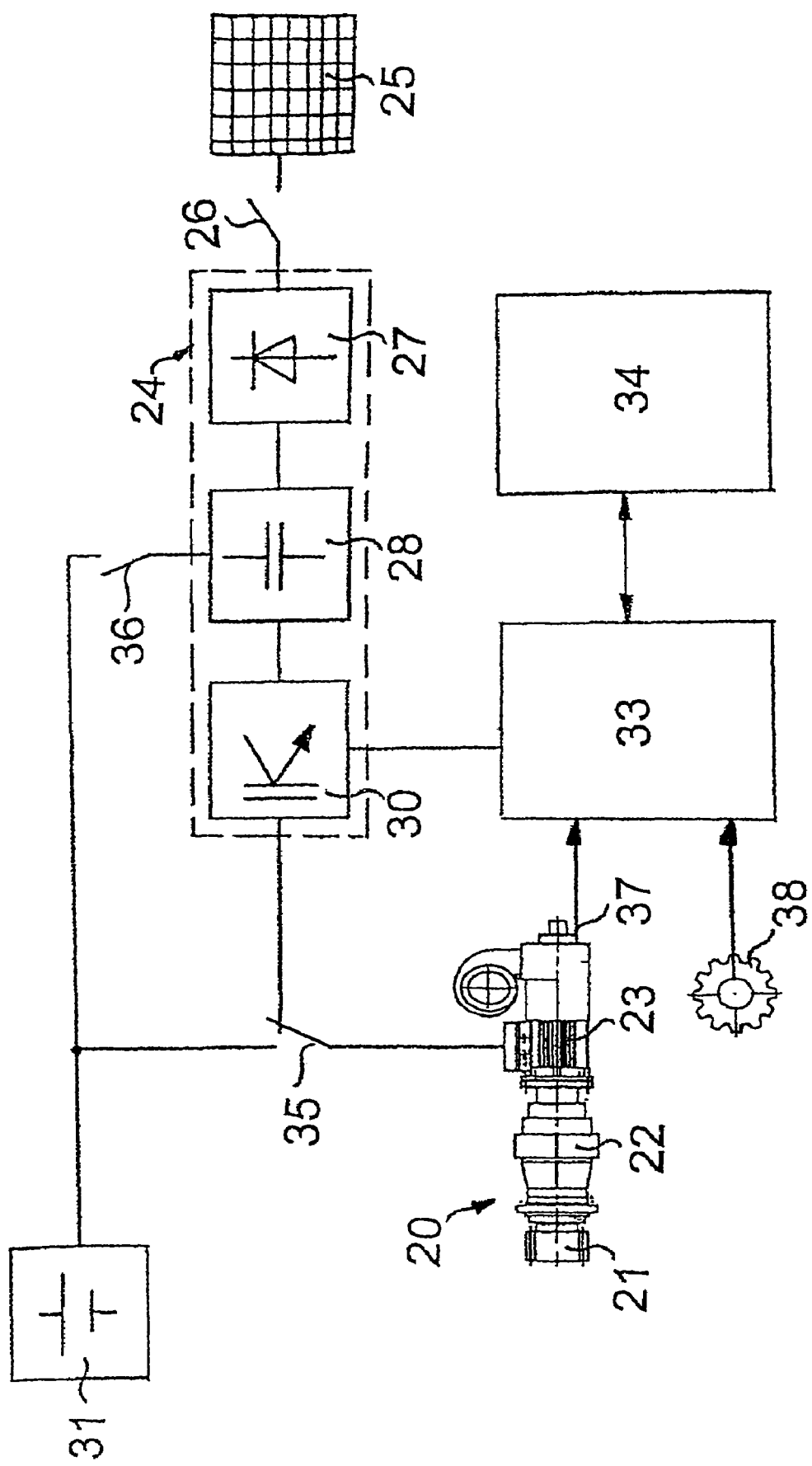
FIG. 2 schematically shows a rotor blade adjustment system.

FIG. 2 is a functional block-diagram of a rotor blade adjustment system fitted with a blade adjusting drive 20. The blade adjusting drive 20 comprises a drive pinion 21, a gear unit 22 and a drive motor 23 which in this particular embodiment is a DC motor.

The DC motor 23 can be connected through a converter 24 to an electric grid 25 managed by a grid operator, the electric grid 25 supplying three-phase AC power. Additional switches 26 are present between the converter 24 and the electric grid 25 to allow separation of the converter 24, and hence the rotor blade adjustment system, from the electric grid 25.

The purpose of the converter 24 is to convert the AC power supplied by the electric grid into DC power to drive the DC motor. Accordingly the converter 24 consists of a rectifier 27, a DC intermediate circuit 28 and a DC chopper controller 30.

The rectifier 27 comprises active switches which in the embodiment shown are IGBT power transistors that are turned ON and OFF by a control unit 33 that is connected to a managing computer 34 monitoring and regulating the entire operation of the wind-driven power-plant. Active switches offer the advantage that the AC power fed from the electric grid 25 by the control unit 33 is modified by pulse-width modulation using corresponding ON/OFF switching of the active switches, whereby DC power of predetermined parameters is generated, the parameters driving, in a controlled manner, the DC motor 23 to adjust the rotor blade into a predetermined position.

In case the electric grid 25 fails, or it is deliberately cut off the wind-driven power-plant 10 by opening the switches 26, the DC motor 23 is connected to a battery 31, thereby assuring power supply to the DC motor 23.

The battery 31 can be connected in two ways to the DC motor 23.

On one hand, the DC motor 23 can be connected through a switch 35 directly to the battery 31. Besides that way, however, the battery 31 also can be connected indirectly through the converter 24 to the DC motor 23. The latter way involves switching the switch 35, so that the DC motor 23 is connected to the converter 24. At the same time, the DC intermediate circuit 28 is connected by closing a switch 36 to the battery 31, whereby power supply to the DC motor 23 is maintained by means of the converter 24.

Indirectly connecting the battery 31 offers the advantage that the DC power made available by the battery is modified in such manner by the converter 24 that the DC motor 23 can be operated in a regulated manner and hence the blade adjustments are also regulated.

Directly connecting the battery 31 to the DC motor 23 only allows rotation of the rotor blade in uncontrolled manner, for instance out of the wind into the so-called feathered position, as a result of which the wind-driven power-plant perforce will be decelerated. Direct connection is applicable only when rotor blade adjustment by means of the converter 24 no longer is feasible, for instance when said converter no longer is operative. Direct connection of the battery 31 to the DC motor 23 is provided solely for safety, namely to make sure that in the event of converter malfunction, the wind-driven power-plant still can be decelerated by rotating the rotor blades into the feathered position.

Nevertheless, the switch 35 shall preferably be designed in a manner that in the case of loss of external power, the battery 31 shall be directly connected to the DC motor 23. In this so-called fail-safe configuration, the power-plant can also be safely decelerated, illustratively after a lightning strike destroys both the grid power supply and the converter.

FIG. 2 further schematically shows a first angle encoder 37 and a second angle encoder 38, the first encoder being mounted on the shaft of the DC motor of the blade adjusting drive and the second said encoder 38 being a pinion meshing with an omitted toothed rim mounted at the blade root.

The invention claimed is:

1. A wind-driven power-plant (10) comprising:
a rotor (12) fitted with at least one angularly adjustable rotor blade (14),
a generator which can be both connected directly or indirectly to the rotor (12) to generate electric power and connected directly or indirectly to an electric grid (25) to feed electric power to said grid, and
at least one rotor blade adjustment system which adjusts the angle of the rotor blade (14) and which is made up of at least one blade adjusting drive (20) fitted with at least one DC motor (23) that may be connected through a converter (24) to the electric grid (25), of a control unit (33) connected to the converter (24) and controlling and/or regulating the blade adjusting drive (20), and of a DC voltage source (31) assuring power supply to the blade adjusting drive (20) in the event of failure of the grid (25), wherein the DC voltage source (31) may be connected directly to the blade adjusting drive (20) or indirectly to it through the converter (24), the DC voltage source (31) being connected in priority manner indirectly through the converter (24) to the blade adjusting drive (20), the converter (24) being designed in a manner to allow converting both the AC voltage from the grid (25) and the DC voltage from the DC voltage source (31).

2. The wind-driven power-plant (10) as claimed in claim 1, wherein the DC voltage source (31) shall be connected to the blade adjusting drive (20) only when the converter (24) fails.

3. The wind-driven power-plant (10) as claimed in claim 1, wherein when connecting the DC voltage source (31) indirectly to the blade adjusting drive (20), said drive can be controlled by a malfunction mode which is stored in the control unit (33), or generated in the control unit (33), or fed into the control unit (33).

4. The wind-driven power-plant (10) as claimed in claim 1, wherein in the event the power-plant (10) is shut down, the electric grid (25) simultaneously has failed and the DC voltage source (31) is directly connected to the blade adjusting drive (20), the blade adjusting drive (20) can be controlled through the control unit (33) to start up the power-plant (10).

5. The wind-driven power plant as claimed in claim 1, wherein the DC voltage source (31) is a battery.

6. The wind driven power-plant (10) as claimed in claim 1, wherein the converter (24) comprises a rectifier (27), an intermediate DC circuit (28) and a DC chopper controller with at least one active switch.

7. The wind-driven power-plant (10) as claimed in claim 6, wherein the active switch is an IGBT.

8. The wind-driven power-plant as claimed in claim 6, wherein the DC voltage source (31) can be connected to the DC voltage intermediate circuit (28).

9. The wind-driven power-plant (10) as claimed in claim 1, wherein the rotor blade adjustment system comprises at least one angle encoder (37, 38) determining the instantaneous angle of the rotor blade (14) and transmitting it to the control unit (33).

10. The wind-driven power-plant (10) as claimed in claim 1, wherein the rotor blade adjustment system comprises at least two angle encoders (37, 38), the control unit (33) being designed in a manner that in the event of one angle encoder (37, 38) failing, said unit (33) shall switch ON the other angle encoder (37, 38).

11. The wind-driven power-plant (10) as claimed in claim 10, wherein the blade adjusting driver (20) comprises a drive side and an output/rotor-blade side, one of the angle encoders (37, 38) being mounted on the drive side and the other on the output/rotor-blade side of the blade adjusting drive (20).

* * * * *